United States Patent [19]

Schumacher

[11] 4,222,924

[45] Sep. 16, 1980

[54] BLENDS OF CLAY, PROCESSING OIL AND ETHYLENE/VINYL ESTER COPOLYMERS

[75] Inventor: Frederick G. Schumacher, Wilmington, Del.

[73] Assignee: E. I. Du Pont de Nemours and Company, Wilmington, Del.

[21] Appl. No.: 963,112

[22] Filed: Nov. 22, 1978

[51] Int. Cl.$^2$ ............................................... C08K 5/01
[52] U.S. Cl. ......................... 260/33.6 UA; 260/42.52
[58] Field of Search ..................... 260/33.6 PQ, 42.52, 260/33.6 UA

[56] References Cited

U.S. PATENT DOCUMENTS

| | | |
|---|---|---|
| 2,883,356 | 4/1959 | Gluesenkamp ..................... 260/42.52 |
| 3,010,899 | 11/1961 | Boyer ........................... 260/33.6 UA |
| 3,817,897 | 6/1974 | Dill ..................................... 260/42.52 |
| 4,100,128 | 7/1978 | Sartori et al. ................. 260/33.6 UA |

Primary Examiner—Lewis T. Jacobs

[57] ABSTRACT

There is provided a means to include clay in hot melt compositions containing substantial quantities of ethylene/vinyl ester copolymers by including a processing oil in the blend in order to passivate the clay. The oil:clay weight ratio should be at least about 1:4.

10 Claims, No Drawings

BLENDS OF CLAY, PROCESSING OIL AND ETHYLENE/VINYL ESTER COPOLYMERS

BACKGROUND OF THE INVENTION

1. Field of the Invention

This invention relates to clay filled blends and more specifically, it relates to clay filled blends of ethylene/vinyl ester copolymers modified with processing oil.

2. Description of the Prior Art

Use of fillers in compounding of adhesives, coatings, mastics, etc. is old art. Generally, the use of fillers contributes stiffness and resistance to elevated temperatures for blends. In addition, fillers increase the density of the blend; and, because most fillers are far less costly than resinous binders, the final filled blends are significantly less costly than are the unfilled precursors.

Clay is a useful filler for many resin-based blends because it is low in cost and can readily be blended in conventional equipment. However, blends which contain both ethylene/vinyl acetate (EVA) copolymer and clay at elevated temperatures often rapidly decompose and liberate copious quantities of anhydrous acetic acid (HAc).

Schwartz U.S. Pat. No. 3,904,456 is related to a method for inhibiting transmission of airborne noise by interposing in the air space between the noise source and the location to be insulated a thin, dense normally self-supporting film or sheet composed essentially of from about 10 to about 40% by weight of ethylene/vinyl acetate copolymer having an average vinyl acetate content of from about 10 to about 42% by weight and a glass transition temperature of at least about 30° C. below the average ambient temperature in the air space, and from about 60 to about 90% by weight of inorganic filler materials, such as sulfates, carbonates, oxides, etc. of barium, calcium, cadmium, etc., effective to produce an overall density greater than at least 2 grams per cubic centimeter.

EVA copolymers have been used industrially for nearly two decades, however, they are not known to be used in conjunction with processing oils as articles of commerce. This could well be an outgrowth of the way EVA commercialization has proceeded. That is, most EVA blends are based on EVA/paraffin wax technology, where paraffin wax weight is often up to ten times the weight of the EVA present. Furthermore, despite the obvious savings inherent in using lower-cost, lower-quality waxes, such as scale wax or slack wax, all attempts to do this have failed. The reason was always the same—the oil content of the wax migrated and destroyed the effectiveness of the coating or adhesive when the oil reached the bond or sheet surface. Thus, compounders "knew" that oil could not be used in EVA blends and technology developed along other lines.

Rundle U.S. Pat. No. 3,497,375 discloses coating compositions for wooden concrete molds consisting of ethylene/vinyl acetate copolymer and paraffinic oil. There is no filler employed in the coating compositions of this patent.

Monaghan U.S. Pat. No. 3,379,193 discloses teeth covers made of ethylene-vinyl acetate copolymer in itself or in combination with mineral oil and, if desired, with fibers and coloring materials. The preferred formulation is disclosed to be 47% by weight of ethylene-vinyl acetate copolymer, 47% by weight of mineral oil, 5% by weight of nylon fibers, and 1% by weight of titanium dioxide.

German Patent Application No. 2,319,431 discloses sound deadening composites suitable for use in automobiles which consist of a highly filled polymer sheet (for example, 300–1200 or even up to 1500 parts of filler per 100 parts of polymer) which on its backside is provided with a filler material sheet, e.g., a polymer foam. Suitable polymers for use are disclosed to be terpolymers of ethylene, propylene and a non-conjugated diene (EPDM), polyvinyl chloride (PVC), mixed polymers of ethylene and vinyl acetate (EVA), styrene-butadiene mixed polymers (SBR) and mixtures of these materials with thermoplastic polymers, such as polystyrene and polyolefins.

Boyer U.S. Pat. No. 3,010,899 discloses blends of ethylene/vinyl acetate resin and mineral oil which are either rubbery or grease like depending upon the proportion of oil to resin and can be used as a substitute for crepe rubber or as a grease. It is further disclosed that fillers such as carbon black or finely divided clays can be added to the rubbery products to increase hardness and produce materials suitable as floor tile. As indicated for example in claim 11, the filler, carbon black, is present in a "minor amount" while the oil-ethylene/vinyl acetate copolymer mixture is present in a "major amount". In Example 2 an oil+resin/carbon black ratio of 4 parts by weight to 1 part by weight is indicated.

Rosenfelder U.S. Pat. No. 3,203,921 discloses the use of compositions consisting essentially of 73–88% by weight of a homo- or copolymer of ethylene (which can be ethylene/vinyl acetate or ethylene/ethyl acrylate copolymer), 2–7% by weight of an aliphatic paraffinic hydrocarbon mineral oil and 10–20% by weight of a mineral filler, (for example, calcium carbonate, barium sulfate, etc.) for preparing blow-molded objects such as dolls.

SUMMARY OF THE INVENTION

According to the present invention there is provided a composition consisting essentially of (a) from about 5 to about 50% by weight of clay; (b) processing oil in an amount that the weight ratio of oil:clay is at least about 1:4 (c) from about 5 to about 50% by weight of at least one copolymer of ethylene with at least one comonomer selected from the group consisting of vinyl esters of saturated carboxylic acids wherein the acid moiety has up to 4 carbon atoms, the ethylene content of said copolymer being from about 60 to about 90% by weight, the vinyl ester comonomer content of said copolymer being from about 10 to about 40% by weight, said copolymer optionally containing from 0 to about 30% by weight of additional comonomer selected from the group consisting of unsaturated mono- or dicarboxylic acids of 3 to 5 carbon atoms and esters of said unsaturated mono- or dicarboxylic acids wherein the alcohol moiety has 1 to 8 carbon atoms, carbon monoxide and sulfur dioxide, and the melt index of said copolymer being from about 0.1 to about 500; and (d) from 0 to about 90% by weight of inert organic or filler additive.

In the context of the present invention the terms "inert organic additive" and "inert filler additive" means that such organic additive does not react with the clay ingredient of the present composition and that the inert filler additive does not react with the ethylene/vinyl ester copolymer ingredient of the present composition.

DETAILED DESCRIPTION OF THE INVENTION

A highly effective way was discovered to enable the use of substantial amounts of clay in EVA blends. It consists of pretreating the clay or a clay/Whiting (naturally occurring ground limestone, $CaCO_3$, from Georgia Marble Company) blend with a processing oil, prior to addition of the EVA and fluxing the mixture. Thus, two steps are involved:

(1) It is necessary to add oil to blends to passivate the clay.

(2) Proper sequencing is necessary to attain success in the mixing operation when complex mixtures are made; that is, use of Sequence A, below, during intensive mixing will be successful; while Sequence B may fail, if the EVA/clay mixture is heated before the clay is passivated:

Sequence A: "X"—Clay—"Y"—Oil—Mix—EVA—Mix.

Sequence B: "X"—Clay—EVA—Mix—Oil—"Y'"—Mix.

In the above illustration, "X" and "Y" may be either nothing or other inert fillers or diluents or resins which do not influence the otherwise probable adverse reaction of EVA with untreated clay.

The ethylene copolymers suitable for the composition of the present invention are copolymers with at least one comonomer selected from the group consisting of vinyl esters of saturated carboxylic acids wherein the acid moiety has up to 4 carbon atoms. Thus, terpolymers of ethylene and the above comonomers are also suitable. In addition terpolymers of ethylene/vinyl ester and up to about 30% by weight of a third comonomer selected from the group consisting of unsaturated mono- or dicarboxylic acids of 3 to 5 carbon atoms and esters of said unsaturated mono- or dicarboxylic acids wherein the alcohol moiety has 1 to 8 carbon atoms, carbon monoxide and sulfur dioxide can also be employed.

The ethylene content of the copolymer is from about 60 to about 90%, preferably from about 65 to about 85% by weight and the comonomer content is from about 10 to about 40%, preferably from about 15 to about 35% by weight. A mixture of two or more ethylene/vinyl ester copolymers can be used in the blends of the present invention in place of a single copolymer as long as the average values for the comonomer content will be within the above indicated range.

Employing a copolymer containing over 28% non-ethylenic comonomer (such as vinyl acetate) results in blends that are less stiff and have lower tensile strength, while their elongation is increased. The most preferred level is about 18 to 28 weight percent. Below 18% vinyl acetate, the blends become much stiffer, lose elongation, and oil compatibility problems arise. Even blends made with nonbleeding oils become "oily" as polyethylene homopolymer is approached.

Melt index of the copolymer can range from about 0.1 to about 500, preferably from about 0.1 to about 50.

Physical properties, principally elongation, decline to lower levels when the ethylene copolymer melt index is above about 30. Lower melt index ranges, about 1 to 10, are most preferred to maintain strength.

Generally from about 5 to about 50% by weight of the ethylene/vinyl ester copolymer is employed in the composition of the present invention, preferably from about 5 to about 40% by weight, and most preferably from about 10 to about 40% by weight.

In accordance with the above, suitable ethylene/vinyl ester copolymers are such as ethylene/vinyl acetate, ethylene/vinyl acetate/acrylic acid, ethylene/vinyl acetate/methacrylic acid, ethylene/vinyl acetate/carbon monoxide/ and ethylene/vinyl acetate/sulfur dioxide. Particularly suitable copolymers are ethylene/vinyl acetate, ethylene/vinyl acetate/methacrylic acid and ethylene/vinyl acetate/carbonmonoxide copolymers.

The oil ingredient of the composition of the present invention is known as processing oil. Three types of processing oils are known-paraffinic, aromatic and naphthenic. None of these are pure, the designations identify the major oil type present.

Paraffinic oils tend to "bleed" from blends. Bleeding is normally not desirable, but could be useful in specialty applications, for example, in concrete forms where mold release characteristics are valued.

On the other hand, naphthenic and aromatic oils are non-bleeding when used in proper ratios and are thus preferable for uses such as automotive carpet backsize.

Processing oils are also subdivided by viscosity range. "Thin" oils can be as low as 100–500 SUS (Saybolt Universal Seconds) at 100° F. (38° C.). "Heavy" oils can be as high as 6000 SUS at 100° F. (38° C.).

A processing oil is the key ingredient required for passivation of clay in simple blends based on the EVA, clay, and inert fillers. The capacity of a given amount of oils in passivation of clay is limited. Thus, while a 3:1 clay-oil blend can be mixed without difficulty, a 4:1 blend shows signs of EVA decomposition. Accordingly the amount of oil present in the compositions of the present invention should be such that the weight ratio of oil:clay is at least about 1:4. For certain applications up to about 30% by weight of oil can be employed in the composition of the present invention.

Table A summarizes the composition, properties and origin of various processing oils.

TABLE A

| | | | | VISCOSITY $SUS^{(2)}$ | | CARBON ATOMS % | | | MOL. |
|---|---|---|---|---|---|---|---|---|---|
| TRADE NAME | ASTM TYPE | TYPE | SP. GR | 100° F. | 210° F. | $C_A$ | $C_N$ | $C_P$ | $WT.^{(3)}$ |
| "CIRCOSOL" 4240 | N | 103 | 0.95 | 2525 | 87 | 21 | 39 | 40 | 395 |
| "CIRCOSOL" 5600 | N | 103 | 0.95 | 5945 | 135 | 20 | 38 | 42 | 450 |
| "CIRCOSOL" 450 | N | 103 | 0.94 | 515 | 52 | 21 | 37 | 42 | 355 |
| "SUNPAR" 150 | P | 104 B | 0.88 | 500 | 64 | 4 | 27 | 69 | 530 |
| "SUNPAR" 2280 | P | 104 B | 0.89 | 2907 | 155 | 4 | 25 | 71 | 720 |

TABLE A-continued
CLASSIFICATION AND CHARACTERISTICS OF PROCESSING OILS

| TRADE NAME | TYPE | ASTM TYPE | SP. GR | VISCOSITY SUS(2) 100° F. | 210° F. | % $C_A$ | $C_N$ | $C_P$ | CARBON ATOMS MOL. WT.(3) |
|---|---|---|---|---|---|---|---|---|---|
| "SUNDEX" 790 | A | 102 | 0.98 | 3500 | 85.7 | 37 | 28 | 35 | 375 |
| "SUNDEX" 8600T | A | 101 | 0.98 | — | 300 | 30 | 22 | 48 | — |
| "SUNTHANE" 450 | N | 103 | 0.93 | 502 | 52 | 15 | 43 | 42 | 355 |
| "SUNTHANE" 4240 | N | 103 | 0.88 | 2206 | 85 | 18 | 41 | 41 | 400 |
| "FLEXON" 340 | A | 102 | 0.95 | 130 | 38.7 | 31 | 41 | 28 | |
| "FLEXON" 766 | N | 104 A | 0.90 | 503 | 58.2 | 1 | 45 | 54 | |
| "FLEXON" 865 | P | 104 B | 0.87 | 332 | 43–61 | 4 | 27 | 69 | |
| "FLEXON" 815 | P | 104 B | 0.90 | 2650 | 155 | 2 | 32 | 66 | |
| "FLEXON" 676 | N | 103 | 0.93 | 1200 | 72 | 15 | 40 | 45 | |
| "FLEXON" 391 | A | 102 | 0.98 | 4010 | 92 | 28 | 43 | 29 | |
| "TUFFLO" 60 | P | — | 0.88 | 600 | 68 | 4 | 26 | 70 | 550 |
| "TUFFLO" 80 | P | | 0.90 | 2640 | 155 | 4 | 23 | 73 | 720 |
| "TUFFLO" 500(4) | N | | 0.94 | 518 | 52 | 22 | 36 | 42 | 355 |
| "TUFFLO" 2000(4) | N | | 0.95 | 2150 | 82 | 20 | 39 | 41 | 390 |
| "TUFFLO" 491(5) | A | | 0.99 | 7060 | 128 | 40 | 20 | 40 | 425 |
| "TUFFLO" 2000(5) | N | | 0.93 | 2110 | 97 | 12 | 38 | 50 | 460 |
| "TUFFLO" 6024(5) | N | | 0.89 | 175 | 43 | 1 | 50 | 49 | 345 |
| "TUFFLO" 6204 | N | | 0.91 | 1750 | 91 | 2 | 49 | 49 | |

(1)A = aromatic; N = naphthenic P = paraffinic. As classified by supplier
(2)SUS = Saybolt Universal Seconds ≅ 5 × Viscosity in centipoise (cp)
(3)as provided by supplier
(4)from Philadelphia
(5)from Houston
Source of Circosol, Sunpar, Sundex, Sunthane oils was Sun Oil
Source of Flexon oils was Exxon
Source of Tufflo oils was Arco The third essential ingredient of the composition of the present invention is clay. A standard text defines clay as "a disperse system of mineral fragments of hydrated aluminum silicate of which particles smaller than two microns predominate." "The term 'clay' refers to a physical condition and not to a definite chemical composition" (Kaolin Clays and Their Industrial Uses—J. M. Huber Corporation, New York, N.Y., 2nd edition, 1955 p.15). A common way of writing the formula is $Al_2O_3.2SiO_2.2H_2O$. Clays used in rubber are classified as "hard" and "soft" types. "Clays which produce a high modulus, high tensile strength, good resistance to abrasion, and a stiff, uncured compound are called 'Hard' clays." (Ibid, p. 15) "Those that produce lower modulus . . . etc. are called 'Soft' clays." "This is an arbitrary classification and has no connection with geological formation or chemical composition."

The amount of clay in the composition of the present invention should be from about 5 to about 50% by weight, preferably from about 15 to about 50% by weight and most preferably from about 15 to about 25% by weight.

Polymers, both homo- and copolymers, other than the ones referred to above, and filler, other than clay can also be used to some extent in the composition of the present invention without significantly interfering with the advantages obtained by the present invention. Similarly other ingredients can also be added to the compositions of the present invention by a compounder in order to obtain some desired effect, such as reduction of cost, or enhancement of physical property. Accordingly, extender resins, waxes, foaming agents, antioxidants etc. that are widely used, particularly in hot melts, can be included in the compositions of the present invention in an amount of up to about 90% by weight, preferably up to about 75% by weight and most preferably in an amount of from about 10 to about 50% by weight.

A commercially sized batch-type Banbury or equivalent intensive mixer is entirely suitable for preparing the compositions of the present invention. A Farrel continuous mixer ("FCM") is also an excellent mixing device. In either instance, dry ingredients are charged in routine fashion. It is convenient in most cases to inject the oil component directly into the mixing chamber of either unit as per widely used practice with this type of equipment. Oil addition should precede fluxing of the charge. A mix cycle of about 3 minutes is generally adequate for the Banbury mixer at an operating temperature usually between 325° and 375° F. The operating rate for the FCM unit generally will fall within ranges predicted by literature prepared by the Farrel Company, Ansonia, Connecticut. Again, temperatures between 325° and 375+ F. are effective. In both cases, a very low oil level, say about 2–3%, may require higher temperatures, while oil levels above about 7% may mix well at lower mixer temperatures. While not evaluated, it is expected that other devices for handling viscous mixes (MI of 0.1 to 20) should be entirely satisfactory—but in any case, prototype trials in advance are desirable.

Once blends are mixed, routine commercial practices may be used, such as underwater melt cutting plus drying or use of sheeting plus chopping methods, to produce a final pelletized product.

Primary use for the compositions of the present invention will probably be in the sheeting field, particularly for low cost, dense, sound-deadening structures. Outstanding characteristics such as improved "hand", "drape", reduced stiffness, and reduced thickness of the extruded sheeting result from the compositions of the present invention.

Low-level filler uses are of course also possible, (see e.g., the compositions of Table II below). While these blends are very simple hot melt compositions, they are indicative of blends which can be used for compounding (after inclusion of tackifiers, fillers, extenders, etc.) blends for use in: hot melt adhesives applied by wheel applicators or guns; and coating blends for corrugated shipping containers, or for coating of paperboard carton stock.

The blends of the present invention can readily be extruded onto a substrate, such as an automotive carpet, or can be extruded or calendered as unsupported film or sheet. Depending upon the equipment used, and the compounding techniques employed, it is possible to extrude wide ranges of film thickness, from below 20 mils to above 75 mils. While not demonstrated, a film thickness of even less than 10 mils and over 100 mils could probably be readily attained. This then provides industry with an opportunity to vary the amount of sound deadening to be attained by varying film thickness, density of blends, ratio of filler load to binder, and similar techniques well known in the art.

In the application of the compositions of the present invention in carpets, the initial "soft" carpet manufacturing stages—tufting of loops, cutting them to form a plush if desired, dyeing and drying, and then storing as unbacked "soft" roll goods until ready to apply a back-coating—are entirely similar to well-known methods as already described in patents, e.g.,: Stahl, U.S. Pat. No. 3,645,948. The disclosure of this patent is hereby incorporated by reference.

The following examples are given for the purpose of illustrating the present invention. All parts and percentages are by weight unless otherwise specified.

EXAMPLE 1 AND COMPARATIVE EXAMPLE 1

As indicated above, blends which contain both ethylene/vinyl acetate copolymer and clay rapidly decompose and liberate copious quantities of anhydrous acetic acid. A blend that shows such characteristics is illustrated in Table I. Both blends were premixed for about ½ minute before being charged to the Banbury mixer. Optionally, the Banbury mixer can be used as the premix vessel, merely by rotating the mixing blades for 15–30 seconds before lowering the ram which closely confines the blend ingredients in the mix chamber. Blend C-1 decomposed within two minutes in a standard Banbury mixer blending cycle. It turned gray, emitted copious quantities of anhydrous acetic acid and was discarded. On the other hand, the blend of Example 1 was readily milled in a Banbury mixer with no signs of degradation, no gray color and no emission of acetic acid.

TABLE I

| Ingredients (parts by wt.) | Ex. C-1 | Ex. 1 |
|---|---|---|
| EPDM[1] | 6 | 6 |
| EVA #1[2] | 11 | 11 |
| "SUPREX" Clay[3] | 5 | 5 |
| "CIRCOSOL" 4240 | — | 8 |

[1] terpolymer of ethylene, propylene and a non-conjugated diene.
[2] 25% vinyl acetate, 75% ethylene, M.I. = 6.
[3] Georgia hard clay from J.M. Huber Co., (chemically = $Al_2O_3 \cdot 2SiO_2 \cdot 2H_2O$)

EXAMPLES 2–3 AND COMPARATIVE EXAMPLES 2–3

Four compositions were prepared as shown in Table II. Melt preparation can be accomplished in any convenient stirred laboratory-type beaker or tank. The order of addition was as follows:

Blend C-2: (1) wax melted, (2) EVA added, (3) clay added after EVA dissolved, (4) blended 10 minutes and poured.

Blend C-3: (1) wax melted, (2) clay added, (3) blended 10 minutes, and (4) EVA added.

Blend Ex. 2: (1) wax melted, (2) "CIRCOSOL" oil added, (3) clay added, (4) EVA added.

Blend Ex. 3: (1) wax melted, (2) "CIRCOSOL" oil added, (3) oven dried clay added, (4) EVA added, Viscosity measurement was done by a Brookfield Thermosel where blend is maintained at 190° C. and viscosity was measured at appropriate intervals.

TABLE II

| Ingredients | Ex. C-2 | Ex. C-3 | Ex. 2 | Ex. 3 |
|---|---|---|---|---|
| EVA #2[1] | 30 | 30 | 30 | 30 |
| Paraffin Wax[2] | 50 | 50 | 45 | 45 |
| "SUPREX" Clay | 20 | 20 | 20 | 20 |
| "CIRCOSOL" 4240 | — | — | 5 | 5 |
| Clay:Oil Ratio | | | 4:1 | 4:1 |
| Thermosel Viscosity (cp) After Time Exposure of X Hrs. AT 190° C. | | | | |
| Initial | 2300 | 1800 | 1150 | 1100 |
| 1 Hr. | 4500 | 2200 | 1200 | 1100 |
| 5 Hr. | — | 2700 | 1300 | 1100 |
| 10 Hr. | — | 3100 | 1350 | 1100 |
| 15 Hr. | — | 3350 | 1400 | 1100 |
| 20 Hr. | — | — | 1550 | 1120 |
| 30 Hr. | — | — | 1800 | 1200 |
| 40 Hr. | — | — | — | 1400 |
| 50 Hr. | — | — | — | 1750 |
| 60 Hr. | — | — | — | 2300 |

[1] 25% vinyl acetate, 75% ethylene, 25 MI.
[2] "Pacemaker" 53, a fully-refined paraffin wax, from Cities Service & Continental Oil Corporation.

In comparing blend C-2 vs C-3, it is evident that both are highly unstable—but C-3 is less unstable than is C-2, as the result of a modified compounding procedure. In both cases, the "pot life" under practical application conditions, is not acceptable.

Example 2 and Example 3 blends are clearly far more stable than are C-2 and C-3. The stability increase is directly attributable to the passivating effect of the processing oil present.

The decomposition/stability data of the present examples shows that the processing oil passivation method is effective with low filler level hot melt blends also.

Table II shows that the clay:oil ratio for Examples 2 and 3 is 4:1. The blends of Example 2 and Example 3 are stable for far longer than are the clay containing, oil-free blends of Comparative Blends C-2 and C-3. Blends C-2 and C-3 increase in viscosity so rapidly that they are of little or no value in commercial systems. By contrast, the Example 2 blend will have a useful "pot life" at 190° C. of perhaps 20 to 30 hours; while blend Example 3, based on clay which has been oven dried for 24 hours at 120° C. prior to compounding, will have a "pot life" approaching 50 hours.

EXAMPLES 4–7 AND COMPARATIVE EXAMPLE 4

The ingredients were premixed in a one-gallon (about 3.8 liter) can by shaking manually for about one half minute. The charge was then added to Banbury type laboratory size intensive high shear mixer. Mix conditions employed were fluxing for three minutes at the temperature of 325°–375° F. (about 160°–190° C.). Composition and physical properties of the blends are summarized in Table III.

A processing oil is a key ingredient required for passivation of clay in simple blends based on EVA, clay, and inert fillers. The capacity of a given amount of oil in passivation of clay is limited. This is shown by examination of Table III, where a 3:1 clay:oil blend can be mixed without difficulty, but a 4:1 blend show signs of EVA decomposition.

Comparative Example 4 of Table III has no clay but does have 72.5% of an inert filler—#9 whiting. The blend can readily be made in a commercial intensive mixer, by batch means, such as a Banbury Mixer, or by continuous means, such as a Farrel Continuous Mixer. Other intensive mixers should be equally effective. There were no signs of blend degradation noted, such as darkening, or emission of acetic acid (HAc) vapor formed on decomposition of EVA resin.

Examples 4 through 7 show what happens as a portion of the Whiting is replaced, weight for weight, by "Suprex" clay. Blends of Examples, 4, 5, and 6 are stable and process well. No acid odor develops. Blend 7 is no longer stable; within a 3-minute Banbury cycle at about 350° F., the relatively high amount of clay (4 times the oil weight) has caused the EVA resin to degrade, as evidenced by the pungent acetic acid odor which results when EVA resins decompose. Thus, for this specific system, the limit of clay addition is between 3 and 4 times the amount of oil added.

TABLE III

| Ingredients | Ex. C-4 | Ex. 4 | Ex. 5 | Ex. 6 | Ex. 7 |
|---|---|---|---|---|---|
| EVA #1 | 16 | 16 | 16 | 16 | 16 |
| EVA #3[1] | 4.2 | 4.2 | 4.2 | 4.2 | 4.2 |
| "CIRCOSOL" 4240 | 7.3 | 7.3 | 7.3 | 7.3 | 7.3 |
| #9 Whiting[2] | 72.5 | 65.2 | 57.9 | 50.6 | 43.3 |
| "SUPREX" Clay | — | 7.3 | 14.6 | 21.9 | 29.2 |
| SP.GR. Of Blend | 1.79 | 1.78 | 1.78 | 1.82 | No |
| Tensile Strength,[3] PSI | 606 | 631 | 630 | 673 | TESTS |
| kPa | 4180 | 4350 | 4350 | 4640 | MADE- |
| Elongation,[3] % | 34 | 36 | 48 | 46 | BLEND |
| Thickness of | | | | | NOT |
| Strip, Mils | 59 | 59 | 59 | 59 | STABLE |
| mm | 1.50 | 1.50 | 1.50 | 1.50 | (ACETIC |
| Stiffness of | | | | | ACID |
| Strip,[4] g | 66 | 63 | 65 | 84 | ODOR) |
| Clay:oil Ratio | — | 1:1 | 2:1 | 3:1 | 4:1 |

[1] 7.5% VAc; 92.5% ethylene; 1.2 M.I.
[2] $CaCO_3$, as commercial ground limestone; from Georgia Marble Co.
[3] Tensile strength & elongation measurements were made using ASTM Method D 1708 at crosshead speed of 2 in (5.1 cm)/min. Samples were 0.876 in. (2.23 cm) × 0.187 in. (0.47 cm) in size, at strip thickness shown in table. (Instron Tester used.)
[4] Stiffness of strip was measured by placing a 1" × 6" (2.54 cm × 15.2 cm) strip on a platform balance, and measuring the force required to make the ends of the test strip meet, at room temperature.

Table III also shows the change in properties which occurs in a blend that contains a fixed percentage of EVA, oil, and filler, at 72.5% filler load, as the filler is changed from all Whiting (C-4) to a substantial substitution of clay for Whiting (Ex. 6). The tensile strength has increased by about 10%, while the elongation has increased by about 35%. However, the blend has also become substantially stiffer—by almost 30%. This effect may or may not be desirable, depending upon the contemplated end use.

EXAMPLES 8–11

The blends were prepared according to the method of the preceding examples. Compositions and physical properties are summarized on Table IV. The data shows that oils other than "CIRCOSOL" 4240 are also highly effective in preventing EVA decomposition resulting from contact during mixing with clay at elevated temperatures. Thus, paraffinic and aromatic oils are as effective as "CIRCOSOL" 4240, which is naphthenic oil.

Table IV further shows that the choice of the type of oil and its viscosity is also influential and must be considered by the compounder. Changing the oil type and the oil viscosity will influence key properties such as tensile strength, elongation, and stiffness—all of which are important to the compounder. None of these changes are "good" or "bad" on an arbitrary basis; the skilled compounder knows that the proper balance of properties is the key to matching end-use demands and thus will employ clay/oil systems when advantages result. This includes deciding whether the ultimate surface characteristic should be "dry"—or slightly oily. For most end uses, a dry feel is required. However, for certain uses, such as mold or form release coatings, a slightly oily surface could prove highly advantageous. As the data show, "dry" surfaces are best secured by inclusion of aromatic or naphthenic oils, while paraffinic oils have a definite tendency towards "bleeding".

TABLE IV

| Ingredients | Ex. 8 | Ex. 9 | Ex. 10 | Ex. 11 |
|---|---|---|---|---|
| EVA #1 | 16 | 16 | 16 | 16 |
| EVA #3 | 4.2 | 4.2 | 4.2 | 4.2 |
| "CIRCOSOL" 4240 | | | | |
| #9 Whiting | 50.6 | 50.6 | 50.6 | 50.6 |
| "SUPREX" Clay | 21.9 | 21.9 | 21.9 | 21.9 |
| "FLEXON 391" | 7.3 | — | — | — |
| "FLEXON 865" | — | 7.3 | — | — |
| "SUNDEX 8600T" | — | — | 7.3 | — |
| "SUNPAR 2280" | — | — | — | 7.3 |
| SP.GR. of Blend | 1.81 | 1.79 | 1.81 | 1.77 |
| Tensile Strength, PSI | 693 | 516 | 785 | 519 |
| kPa | 4780 | 3560 | 5410 | 3580 |
| Elongation, % | 38 | 46 | 42 | 36 |
| Stiffness, g | 84 | 97 | 91 | 86 |
| Thickness of | | | | |
| Strip, Mils | 59 | 59 | 59 | 59 |
| mm | 1.50 | 1.50 | 1.50 | 1.50 |
| Does Oil | | | | |

TABLE IV-continued

| Ingredients | Ex. 8 | Ex. 9 | Ex. 10 | Ex. 11 |
|---|---|---|---|---|
| Exude? | NO | YES-1 Day | NO | YES-1 Day |
| Banbury HAc Odor? | NO | NO | NO | NO |

EXAMPLES 12-19 AND COMPARATIVE EXAMPLES 5-10

These examples provide further illustration of the composition of the present invention with different types of EVA copolymer and with varying levels of clay, oil and filler compared to filler compositions without clay. Compositions, and physical properties are summarized in Table V. In spite of the difficulty in precisely measuring physical properties of thin strips, of thermoplastic blends the overall conclusion remains; i.e., inclusion of clay in blends is useful to the compounder who seeks additional stiffness and higher elongation in such blends. This combination might be of particular value when blends are to be used to produce molded articles. Table V also shows that compounding is possible over a wide variation in type of EVA and over a broad range of filler levels. Finally, Example 19 shows once again the need to maintain enough oil to passivate the clay. In this case, the 5:1 clay:oil ratio proved to be too high.

TABLE VI

| Ingredients (parts by wt.) | Ex. 20 | Ex. 21 | Ex. 22 | Ex. 23 |
|---|---|---|---|---|
| EVA #4 | 18 | — | 18 | — |
| EVA #1 | — | 18 | — | 18 |
| "CIRCOSOL" 4240 | 7 | 7 | 12 | 12 |
| #9 Whiting | 40 | 40 | 40 | 40 |
| "SUPREX" Clay | 35 | 35 | 35 | 35 |
| Clay:Oil Ratio | 5:1 | 5:1 | 2.92:1 | 2.92:1 |
| Blend Color | SLATE | BROWN/GRAY | TAN | TAN |
| Acetic Acid Odor | STRONG | STRONG | NONE | NONE |

COMPARATIVE EXAMPLES 11-17

In order to determine the relative stability of different types of ethylene interpolymers, it was necessary to attain a better understanding of the forces needed to break down ethylene-vinyl acetate copolymers. Also, it was considered important to try to relate a small-scale, commercial-type Banbury mixer to a bench-scale Plastograph mixer. As the breakdown product of an EVA copolymer is acetic acid, which is highly odorous and irritating to eyes and throat, small-scale tests are preferable whenever possible. Data developed during these experiments are summarized in Table VII.

In comparing results of tests C-11 and C-12, it is evident that blend C-11 is relatively stable. While is might break down under more severe mixing conditions or

TABLE V

| Ingredients | Ex. C-5 | Ex. 12 | Ex. C-6 | Ex. 13 | Ex. C-7 | Ex. 14 | Ex. C-8 | Ex. 15 | Ex. C-9 | Ex. 16 | Ex. C-10 | Ex. 17 | Ex. 18 | Ex. 19 |
|---|---|---|---|---|---|---|---|---|---|---|---|---|---|---|
| EVA #4[1] | — | — | — | — | — | — | — | — | — | — | — | — | — | 18 |
| EVA #2 | 15 | 15 | 10 | 10 | 9 | 9 | 11.25 | 11.25 | 10.5 | 10.5 | 8.0 | 8.0 | — | — |
| EVA #1 | 15 | 15 | 10 | 10 | 9 | 9 | 11.25 | 11.25 | 10.5 | 10.5 | 8.0 | 8.0 | — | — |
| EVA #5 [2] | — | — | — | — | — | — | — | — | — | — | — | — | 21 | — |
| "CIRCOSOL" 4240 | 5 | 5 | 5 | 5 | 7 | 7 | 7.5 | 7.5 | 9.0 | 9.0 | 9.0 | 9.0 | 9 | 7 |
| #9 Whiting | 65 | 60 | 75 | 70 | 75 | 68 | 70 | 62.5 | 70 | 65 | 75 | 66 | 60 | 40 |
| "SUPREX" Clay | — | 5 | — | 5 | — | 7 | — | 7.5 | — | 5 | — | 9 | 10 | 35 |
| SP.GR. of Blend | 1.64 | 1.65 | 1.87 | 1.87 | 1.87 | 1.85 | 1.76 | 1.76 | 1.76 | 1.73 | 1.85 | 1.87 | 1.74 | 1.84 |
| Tensile Strength, PSI | 458 | 542 | 685 | 695 | 585 | 579 | 557 | 534 | 488 | 500 | 482 | 479 | 490 | 568 |
| kPa | 3160 | 3740 | 4720 | 4790 | 4030 | 3990 | 3840 | 3680 | 3360 | 3450 | 3320 | 3300 | 3380 | 3920 |
| Elongation, % | 326 | 418 | 18 | 23 | 19 | 27 | 37 | 56 | 38 | 50 | 23 | 25 | 51 | 12 |
| Thickness of strip, Mils | 68 | 67 | 58 | 58 | 59 | 58 | 62 | 62 | 62 | 62 | 58 | 57 | 62 | 59 |
| mm | 1.73 | 1.70 | 1.47 | 1.47 | 1.50 | 1.47 | 1.57 | 1.57 | 1.57 | 1.57 | 1.47 | 1.45 | 1.57 | 1.50 |
| Stiffness of strip, g | 79 | 81 | 84 | 94 | 73 | 75 | 65 | 67 | 62 | 60 | 53 | 60 | 98 | 132 |
| Odor noted[3] | No | No | No | No | No | No | No | No | No | No | No | No | No | Yes |

[1] 18% VAc; 82% ethylene; M.I. = 2.5
[2] 28% Vinyl Acetate; 72% ethylene; M.I. = 6.0
[3] Odor of acetic acid, indicative of decomposition of EVA Resin.

EXAMPLES 20-23

Most of the earlier examples (except for Ex. 7 & 19) had a clay content of about 20% or below. The effects noted earlier apply with equal force at higher levels as illustrated in Table VI. Here, the first pair of blends—Examples 20 and 21—show the same effect for both of the EVA resins employed. That is, at a clay:oil ratio of 5:1, the blends degraded badly during the 3-minute mixing cycle at 350° F., a relatively standard mixing condition. When the experiments were repeated with the same amount of every ingredient except for oil, both blends—Examples 22 and 23—proved to be stable. Here, the clay:oil ratio was about 2.9:1, similar to ratios found effective at lower clay levels.

longer time-temperature exposure, it is not an effective evaluation means for stress-type tests. Conditions for Blend C-12 are more severe—the clay:resin ratio has been doubled—and the Plastograph shows inherent instability (rise of about 25% in mixer torque after one hour). Tests of the same composition, Run C-13, show the blend really does not have good stability under a commercial intensive mixing cycle, as evidenced by development of copious amounts of anhydrous acetic acid (HAc) vapor during mixing in a Banbury-type mixer. Thus, still more stringent Plastograph conditions are needed, as per Blend C-14. Here, the mix conditions and blend proportions were not changed, but the mixer speed was advanced from 90 RPM to 150 RPM. Under these conditions, the Plastograph product evidenced the rapid degradation noted for the Banbury-type mixer, Blend C-13.

A short series of runs (C-15, 16, and 17) was then made under identical conditions to those used in run C-14, using ethylene interpolymers made with other than vinyl acetate (VAc) as a comonomer. All blends were far more stable than was the VAc-containing copolymer, which is particularly susceptible to breakdown when exposed to hot, unpassivated clay filler.

TABLE VII

| Ingredients[1] | EX. C-11 | EX. C-12 | EX. C-13 | EX. C-14 | EX. C-15 | EX. C-16 | EX. C-17 |
|---|---|---|---|---|---|---|---|
| EVA #2 | 40 | 22 | 22 | 22 | — | — | — |
| E/EA Resin[2] | — | — | — | — | 22 | — | — |
| E/MMA Resin[3] | — | — | — | — | — | 22 | — |
| E/IBA Resin[4] | — | — | — | — | — | — | 22 |
| #9 Whiting | 35 | 48 | 48 | 48 | 48 | 48 | 48 |
| "SUPREX" Clay | 25 | 30 | 30 | 30 | 30 | 30 | 30 |
| Clay:Resin Ratio | 0.62 | 1.36 | 1.36 | 1.36 | 1.36 | 1.36 | 1.36 |
| Mixer Type[5] | PG | PG | BB | PG | PG | PG | PG |
| Mixer RPM | 90 | 90 | — | 150 | 150 | 150 | 150 |
| Acid Odor | NONE[9] | NONE[9] | VERY[6] STRONG | VERY[7] STRONG | NONE[9] | NONE[9] | NONE[9] |
| PG Torque,[5] After mixing for: | | | | | | | |
| 2 Min | — | — | DOES | 2500 | — | — | — |
| 5 Min | 1725 | 3175 | | 3150 | 2250 | 3050 | 3200 |
| 10 Min | — | — | NOT | 4300 | 2300 | 3850 | 2750 |
| 20 Min | — | — | | — | 2150 | 2875 | 2575 |
| 30 Min | 1675 | 3550 | APPLY | — | 2100 | 3200 | 2550 |
| 40 Min | — | — | | — | 2150 | 3900 | 2575 |
| 60 Min | 1675 | 3975 | (8) | — | 2325 | — | 2750 |

[1]All proportions for all blends are by weight. Plastograph charge scaled to fill the 50 ml chamber for the unit. Banbury-type mixer charge also sized to fill the unit (approx. 1100 ml.).
[2]82% ethylene; 18% ethyl acrylate; M.I. = 6
[3]69% ethylene; 31% methyl methacrylate; M.I. = 72
[4]80% ethylene; 20% isobutyl acrylate; M.I. = 2.5
[5]Mixer types & operating conditions:
PG = Plastograph, operated at 190° C. (approx. 375° F.) Torque was monitored by a recorder throughout the length of the run. Units = meter-grams.
BB = Standard Banbury-type intensive mixer, operated at 350° F. (177° C.), for a 3-minute mix cycle.
[6]Acetic acid, as volume is large, test mixtures of this type must be made with adequate ventilation to protect personnel.
[7]Acetic acid, minimal volume in Plastograph sharply reduces risk of contamination of work area.
[8]Speed adjusted to maintain 350° F. temperature. Power input was not measured.
[9]No odor of decomposed polymer or breakdown to create free monomer noted.

I claim:

1. A composition consisting essentially of (a) from about 15 to about 25% by weight of clay; (b) processing oil in an amount that the weight ratio of oil:clay is from about 1:2.5 to about 1:1; (c) from about 10 to about 40% by weight of ethylene/vinyl acetate copolymer, the ethylene content of said copolymer being from about 60 to about 90% by weight, the vinyl acetate comonomer content of said copolymer being from about 10 to about 40% by weight, said copolymer optionally containing from 0 to about 30% by wt. of additional comonomer selected from the group consisting of unsaturated mono- or dicarboxylic acids of 3 to 5 carbon atoms and esters of said unsaturated mono- or dicarboxylic acids wherein the alcohol moiety has 1 to 8 carbon atoms, carbon monoxide and sulfur dioxide, and the melt index of said copolymer being from about 0.1 to about 500; and (d) from about 10 to about 50% by weight of inert organic or filler additive.

2. The composition of claim 1 wherein the ethylene content of said ethylene copolymer is from about 72 to about 82% by weight, the comonomer content of said copolymer is from about 18 to about 28% by weight and the melt index of said copolymer is from about 1 to about 10.

3. A process of preparing stable blends of clay and ethylene/vinyl ester copolymers comprising (1) mixing (a) from about 5 to about 50% by weight of clay and (b) processing oil in an amount that the weight ratio of oil:clay is at least about 1:4; (2) adding to the oil-clay mixture (c) from about 5 to about 50% by weight of at least one copolymer of ethylene with at least one comonomer selected from the group consisting of vinyl esters of saturated carboxylic acids wherein the acid moiety has up to 4 carbon atoms, the ethylene content of said copolymer being at least about 60% by weight, the vinyl ester comonomer content of said copolymer being from an amount sufficient to provide the desired oil compatibility and blend elongation to about 40% by weight, said copolymer optionally containing from 0 to about 30% by weight of additional comonomer selected from the group consisting of unsaturated mono- or dicarboxylic acids of 3 to 5 carbon atoms and esters of said unsaturated mono- or dicarboxylic acids wherein the alcohol moiety has 1 to 8 carbon atoms, carbon monoxide and sulfur dioxide, and the melt index of said copolymer being from about 0.1 to about 500; and (3) adding, before, during or after the clay is mixed with the oil (d) from 0 to about 90% by weight of inert organic or filler additive.

4. The process of claim 3 wherein the comonomer content of said copolymer is from about 5 to about 40% by weight.

5. The process of claim 4 wherein said clay is present in an amount of from about 15 to about 50% by weight, said processing oil is present in an amount that the weight ratio of oil:clay is at least about 1:3 said copolymer of ethylene is present in an amount of from about 5 to about 40% by weight, and said inert organic or filler additive is present in an amount of from 0 to about 75% by weight.

6. The process of claim 5 wherein said copolymer of ethylene is selected from the group consisting of ethylene/vinyl acetate, ethylene/vinyl acetate/carbon monoxide and ethylene/vinyl acetate/methacrylic acid.

7. The process of claim 6 wherein the ethylene content of said copolymer is from about 65 to about 85% by weight, the comonomer content of said copolymer is from about 15 to about 35% by weight and the melt index of said copolymer is from about 0.1 to about 50.

8. The process of claim 7 wherein said copolymer of ethylene is ethylene/vinyl acetate.

9. The process of claim 8 wherein said clay is present in an amount of from about 15 to about 25% by weight, said processing oil is present in an amount that the weight ratio of oil:clay is from about 1:2.5 to about 1:1, said ethylene/vinyl acetate is present in an amount from about 10 to about 40% by weight and said inert organic or filler additive is present in an amount of from about 10 to about 50% by weight.

10. The process of claims 5, 7 or 9 wherein the ethylene content of said ethylene copolymer is from about 72 to about 82% by weight, the comonomer content of said copolymer is from about 18 to about 28% by weight and the melt index of said copolymer is from about 1 to about 10.

* * * * *